(12) United States Patent
Mileti et al.

(10) Patent No.: US 11,825,956 B2
(45) Date of Patent: *Nov. 28, 2023

(54) BLEACH COMPATIBLE POLYOLEFIN MATTRESS COVER

(71) Applicants: Stacey duBell Mileti, Torrington, CT (US); Robert J. Mileti, Torrington, CT (US); Kevin P. Conway, Portage, MI (US)

(72) Inventors: Stacey duBell Mileti, Torrington, CT (US); Robert J. Mileti, Torrington, CT (US); Kevin P. Conway, Portage, MI (US)

(73) Assignee: Unisoft Medical Corporation, Torrington, CT (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/451,750

(22) Filed: Oct. 21, 2021

(65) Prior Publication Data

US 2022/0031087 A1 Feb. 3, 2022

Related U.S. Application Data

(62) Division of application No. 15/938,652, filed on Mar. 28, 2018, now Pat. No. 11,166,568.

(Continued)

(51) Int. Cl.
*A47C 31/10* (2006.01)
*A47C 27/00* (2006.01)
(Continued)

(52) U.S. Cl.
CPC .......... *A47C 31/105* (2013.01); *A47C 27/002* (2013.01); *A47C 27/082* (2013.01);
(Continued)

(58) Field of Classification Search
CPC ... A47C 31/105; A47C 27/002; A47C 27/082; A47C 27/10; B29C 65/04; B29C 65/08;
(Continued)

(56) References Cited

U.S. PATENT DOCUMENTS 5,050,256 A 9/1991 Woodcock
5,162,007 A 11/1992 Leslie
(Continued)

FOREIGN PATENT DOCUMENTS

WO 2012038451 A1 3/2012

OTHER PUBLICATIONS

ASTM International. ASTM F1670/F1670M—17A(2017)e1-Standard Test Method for Resistance of Materials Used in Protective Clothing to Penetration by Synthetic Blood (2014).
(Continued)

*Primary Examiner* — Eric J Kurilla
(74) *Attorney, Agent, or Firm* — ST. ONGE STEWARD JOHNSTON AND REENS (57) ABSTRACT

A bleach compatible mattress cover made of a non-woven polyolefin material and defining an interior cavity. The interior cavity configured to receive a mattress structure which may include a first and second support structure disposed in the interior cavity. In certain embodiments, the mattress cover has a Moisture Vapor Transfer Rate of greater than or equal 400 to less than 10,000, 7500 or more particularly less than 5000 grams per square meter per day and a hydrostatic head of 100 cm or greater and passes ASTM 1670 and ASTM 1671.

26 Claims, 6 Drawing Sheets

Related U.S. Application Data (60) Provisional application No. 62/477,782, filed on Mar. 28, 2017.

(51) Int. Cl.
    *A47C 27/08*     (2006.01)
    *B29C 65/38*     (2006.01)
    *B29L 31/00*     (2006.01)
    *B29C 65/00*     (2006.01)
    *B29K 623/00*     (2006.01)
    *B29L 22/02*     (2006.01)
    *B29C 65/04*     (2006.01)
    *B29C 65/08*     (2006.01)
    *B29C 65/48*     (2006.01)

(52) U.S. Cl.
CPC .............. *B29C 65/04* (2013.01); *B29C 65/08* (2013.01); *B29C 65/38* (2013.01); *B29C 65/48* (2013.01); *B29C 66/133* (2013.01); *B29C 66/1312* (2013.01); *B29C 66/432* (2013.01); *B29C 66/71* (2013.01); *B29C 66/7294* (2013.01); *B29C 66/73175* (2013.01); *B29C 66/73182* (2013.01); *B29C 66/73186* (2013.01); *B29C 66/73921* (2013.01); *B29C 66/83221* (2013.01); *B29K 2623/00* (2013.01); *B29K 2995/0093* (2013.01); *B29L 2022/02* (2013.01); *B29L 2022/025* (2013.01); *B29L 2031/751* (2013.01)

(58) Field of Classification Search
CPC ... B29C 65/48; B29C 66/1312; B29C 66/133; B29C 66/432; B29C 66/71; B29C 66/7294; B29C 66/73175; B29C 66/73182; B29C 66/73186; B29C 66/73921; B29C 66/83221; B29K 2623/00; B29K 2995/0093; B29L 2022/025; B29L 2031/751
See application file for complete search history.

(56) References Cited

U.S. PATENT DOCUMENTS

| | | |
|---|---|---|
| 5,409,761 A | 4/1995 | Langley |
| 5,560,974 A | 10/1996 | Langley |
| 6,079,070 A | 6/2000 | Flick |
| 6,238,767 B1 | 5/2001 | McCormack et al. |
| 6,516,482 B2 | 2/2003 | Karafa et al. |
| 8,434,175 B1 | 5/2013 | Wright et al. |
| 8,791,321 B2 | 7/2014 | Love et al. |
| 8,935,820 B2 | 1/2015 | Mileti |
| 9,259,096 B2 | 2/2016 | Cik |
| 9,592,314 B2 | 3/2017 | Rogers |
| 9,596,946 B2 | 3/2017 | Scarleski |
| 11,166,568 B2 * | 11/2021 | Mileti .................. A47C 31/105 |
| 2002/0148047 A1 | 10/2002 | Corzani et al. |
| 2003/0121101 A1 | 7/2003 | Corzani et al. |
| 2005/0097674 A1 | 5/2005 | Mileti |
| 2007/0066166 A1 | 3/2007 | Davis |
| 2008/0141463 A1 | 6/2008 | Dionne et al. |
| 2012/0071051 A1 | 3/2012 | Ray |
| 2013/0183495 A1 | 7/2013 | Rock |
| 2014/0359948 A1 | 12/2014 | Middlesworth et al. |
| 2016/0037769 A1 | 2/2016 | Murphy et al. |
| 2016/0366952 A1 | 12/2016 | Plut |
| 2017/0190494 A1 | 7/2017 | Stickler |

OTHER PUBLICATIONS

ASTM, F. "Standard test method for resistance of materials used in protective clothing to penetration by blood-borne pathogens using Phi-X 174 bacteriophage penetration as a test system 1671.".

Durable Nonwovens, Textile World, May 16, 2011; http://www.textileworld.com/textile-world/nonwovens-technical-textiles/2011/05/durable-nonwovens/.

Dutscher, Chemical Resistance Guide, 2014 (Retrieved from https://www.dutscher.com/data/pdf_guides/en/CCTPPA.pdf) (Year: 2014).

Gunter, H. "Mattress Makers Uncover Guests'Desire for Better Bedding." Hotel & Motel Management 219.16 (2004): 74-75.

Hooker, Edmond A., et al. "A randomized trial to evaluate a launderable bed protection system for hospital beds." Antimicrobial resistance and infection control 1.1 (2012): 27.

Nonwovens Standard Procedures Edition 2015.

Novel, "Breathable" Polyurethane Dispersions, Jan. 1, 2005, https://www.pcimag.com/articles/82796-novel-breathable-polyurethane-dispersions.

* cited by examiner

BLEACH COMPATIBLE POLYOLEFIN MATTRESS COVER

FIELD OF THE INVENTION

The following relates to a mattress cover, more particularly a cushion/support cover, particularly a mattress cover or pillow or other cushion cover that can be easily cleaned and disinfected while providing for user comfort and a microclimate suitable for skin protection.

BACKGROUND OF THE INVENTION

Healthcare mattresses, especially those in the Intensive Care Unit (ICU) and Isolation Rooms are used by numerous persons. Although there are significant efforts made to clean these mattresses, sterilization or even adequate cleaning is often not possible. Many of the mattresses used are pressure relieving or reducing; some provide a fluid pressurized bladder that alternates pressure between various chambers to prevent discomfort, bed sores and/or resulting infections, some reduce interface pressure by other means including the use of foams and gels. The problem is that these mattresses are classified as reusable medical devices and are made of relatively soft and porous materials, or materials that degrade over time from cleaning and disinfecting. These mattresses will often contact fluids and solid materials such as blood, urine, feces and other biological matter. Many of these mattresses suffer a disadvantage in that they may absorb such materials.

At the same time, some vapor transfer is necessary to provide patient comfort and skin protection.

Since many current mattresses are considered durable goods and are re-used for many patients, there is an attempt to clean and disinfect the mattresses between patients. However, these mattresses commonly use flexible PVC, nylon coated urethanes and other materials subject to degradation in the construction of their covers.

The most effective or "aggressive" cleaners and disinfectants such as bleach (sodium hypochlorite) are not compatible with current mattress covers, however many hospitals may use bleach based cleaners and other of these types of aggressive cleaners on mattresses anyway. The problem is that the use of an incompatible cleaner or disinfecting technology on the mattress cover may degrade the cover, allowing bodily fluids and/or other potentially infectious matter from successive patients to seep into the mattress and irreversibly contaminate it. When the cover is damaged, the mattress may become more dangerous than whatever ailment the patient enters the hospital with such that the patient acquires an infection in the hospital. Further, this cover damage may be "occult" making it subject to being overlooked by healthcare workers. In contrast, materials compatible with bleach or aggressive cleaners will not substantially degrade over time.

A mattress is normally classified by the FDA as a Class II reusable medical device. This classification requires mattresses to undergo a rigorous pre-cleaning and disinfection procedure. Cleaning and disinfecting agents and devices are normally regulated by the Environmental Protection Agency (EPA). The mattress must however be a soft surface to provide comfort and a healthy microclimate for the patient. Hospital grade disinfectants do not meet the regulatory requirements for disinfection of soft surfaces. 2015 FDA Guidelines for reprocessing reusable medical devices require different protocols for various germs, spores and bio burdens. As a result, it is very difficult if not impossible to properly clean a mattress to the level necessary for a reusable medical device. For example, some studies have shown that only 50-80% of the bio-burden is removed in a cleaning process. Thus 20-50% of the bio-burden is left in place where it poses a hazard to patients, visitors and healthcare workers.

*Clostridium difficile* infections (*C. difficile* or *C. diff*) is one example of a common healthcare acquired infection. The only recommended cleaning agent adequate for killing *C. diff* spores is bleach. *C. diff* is a symptomatic infection due to the spore-forming bacterium, *Clostridium difficile*. Symptoms include watery diarrhea, fever, nausea, and abdominal pain. It makes up about 20% of cases of antibiotic-associated diarrhea. Complications may include pseudomembranous colitis, toxic megacolon, perforation of the colon, and sepsis.

*Clostridium difficile* infection is spread by bacterial spores found within feces. Surfaces may become contaminated with the spores, with further spread occurring via the hands of healthcare workers and visitors. Risk factors for infection include antibiotic or proton pump inhibitor use, hospitalization, other health problems, and older age. Diagnosis is by stool culture or testing for the bacteria's DNA or toxins. If a person tests positive but has no symptoms it is known as *C. difficile* colonization rather than an infection. The prevalence of asymptomatic *C. difficile* colonization may be as high as 15% of the population.

Prevention is by limiting antibiotic use, hand washing, and terminal room cleaning in hospitals. Discontinuation of antibiotics may result in resolution of symptoms within three days in about 20% of those infected. The antibiotics metronidazole, vancomycin or fidaxomicin may cure the infection. Retesting after treatment, as long as the symptoms have resolved, is not recommended as the person may remain colonized. Recurrence has been reported in up to 25% of people. There is tentative evidence that fecal microbiota transplantation and probiotics may decrease the risk of recurrence.

*C. difficile* infections occur in all areas of the world. About 453,000 cases occurred in the United States in 2011 resulting in 29,000 deaths. Rates of disease globally have increased between 2001 and 2016. Women are more often affected than men. The bacterium was discovered in 1935 and found to be disease-causing in 1978. In 2013, C. diff infections in the United States increased the cost of healthcare by 1.5 billion USD.

*C. diff* is particularly challenging because it can live on surfaces for many months and the best method for eradicating it is limited to bleach which breaks down the mechanical barrier properties of the currently available mattress covers, creating strikethrough. This strikethrough results in germs and spores being left on and forced into the mattress. Strikethrough is often "occult," meaning it is not visible except with magnification. Since the mattress is re-used, the next patient may be infected by the bio-burden left over from the previous patient. The average life span of a hospital mattress is about 5 or more years, which means over 300 patients may use the same mattress. A hospital patient has no way of knowing if they are the first or 300th person to use the mattress. Furthermore, studies show that germs, spores and patients' DNA remain on and in the mattress even after the mattress is cleaned using approved procedures.

Although there are new generations of bleach formulas being introduced such as Clorox Healthcare's "FUZION" formulation, this formula still may not meet the regulatory requirements for disinfecting soft surfaces. Healthcare associated (or acquired) infections (HAIs) remain a top priority in acute and post-acute care settings. Prior art mattresses and their covers have to this point been cleaned with bleach which is not compatible and results in the aforementioned strikethrough. The strikethrough in turn increases the risk of HAIs.

Sodium hypochlorite is an unstable compound. The stability of sodium hypochlorite is highly affected by the purity of sodium hypochlorite. A slight excess of sodium hydroxide is needed for stability. There are many factors affecting the stability. Lower concentrations are more stable than higher strength solutions. Decomposition of bleach cannot be avoided, but the rate of decomposition can be influenced by contact with catalyzing metallic impurities and organic impurities, exposure to light and the pH of solution. The temperature at which the bleach is manufactured, shipped, and stored influences the stability because the decomposition rate accelerates as temperature increases. Relatively few materials of construction can withstand the highly reactive nature of sodium hypochlorite. Using incompatible material with bleach can damage equipment and contaminate product. The decomposition of sodium hypochlorite leads to the formation of chlorates and chloride ions. A slower second pathway of decomposition leads to oxygen and chloride formation. Both forms of decomposition leave deposits of white powder containing sodium chlorate.

Although U.S. Pat. Nos. 8,434,175 and 9,259,096 provide polyethylene or layered polyolefin materials to create a cover, these do not contemplate bleach compatible materials, heat sealing or use of pressure relieving bladders/supports to name a few examples where the prior art is deficient. Therefore a need exists for a mattress and mattress cover that can provide for improved cleaning and decreased risk of hospital associated or acquired infections.

SUMMARY OF THE INVENTION

What is therefore desired is to provide a mattress cover that is both economical and effective at reducing transfer of fluids, organisms and infectious matter into the mattress interior.

What is further desired is to provide a mattress cover that is compatible with aggressive cleaners such as bleach to enable the mattress cover to be cleaned without significantly degrading the cover.

What is further desired is a mattress cover that provides appropriate vapor transfer to provide comfort and skin protection while preventing organisms and bodily fluids from entering the internal parts of the mattress.

What is further desired is to provide a single patient use mattress with a bleach or other aggressive cleaning agent/method compatible cover that is both comfortable and economical.

These and other objects are achieved by providing a cover made of a non-woven bleach compatible polyolefin material having sufficient hydrostatic head to provide an adequate fluid barrier while also having enough of a moisture vapor transfer rate (MVTR) to provide a breathable and comfortable cover.

As used herein "ASTM 1670" refers to the test standard published as ASTM F1670/F1670M-17a, Standard Test Method for Resistance of Materials Used in Protective Clothing to Penetration by Synthetic Blood, ASTM International, West Conshohocken, Pa., 2017, www.astm.org. ASTM 1670 as referenced in this paragraph is incorporated by reference to this application in its entirety as if fully set forth herein. A copy is submitted with the IDS.

As used herein "ASTM 1671" refers to the test standard published as ASTM F1671/F1671M-13, Standard Test Method for Resistance of Materials Used in Protective Clothing to Penetration by Blood-Borne Pathogens Using Phi-X174 Bacteriophage Penetration as a Test System, ASTM International, West Conshohocken, Pa., 2013, www.astm.org. ASTM 1671 as referenced in this paragraph is incorporated by reference to this application in its entirety as if fully set forth herein. A copy is submitted with the IDS.

As used herein "irremovable" refers to a construction where a structure or thing requires a form of destructive force to separate that structure or thing from another structure or thing. For the avoidance of doubt, "irremovable" does not require bonding or securing along the entire surface.

In certain aspects the cover provides an interior cavity which contains an assembly of connected air cells with a moisture absorbing material between the top of the air cells and the top cover therein. In certain aspects, the moisture absorbing structure provides both moisture absorption and increased pressure redistribution. In other aspects, the cover material has a moisture vapor transfer rate of 2500-3500 grams per square meter per day and a hydrostatic head greater than about 100 cm or in particular embodiments 150-250 cm. In other aspects, the cover comprises top and bottom panels heat sealed together along their edges wherein the top and bottom panels are made of different materials. In other aspects the bottom panel is made of a non-breathable material. In other aspects, the cover is comprised of a single panel long enough to encase the top and bottom and ends. The cover may also be comprised of a tubular length of material designed to be sealed at both ends. In certain aspects, the cover is configured much like a fitted sheet or like a pillow case with three sides bonding together the top and bottom panels, for example by heat sealing or other bonding methods. The opening of the pillow case configuration may be releasable such as a zipper, hook and loop (i.e. Velcro® type closure) or other appropriate closures.

In one aspect a mattress cover is provided including a cover member defining a cavity configured to receive a support structure therein. Top and bottom panels of the cover member are provided and the top panel is made of a non-woven bleach compatible polyolefin material having a moisture vapor transfer rate (MVTR) of at least 400 but less than 10,000 or more particularly less than 7500 or even more particularly less than 5000 grams per square meter per day and a hydrostatic head which is greater than 100 cm. In this configuration the MVTR and hydrostatic head of the material creates a cover which is breathable but has viral and liquid barrier properties sufficient to inhibit bacteria and viruses from passing through the top panel of the cover. The top and bottom panels are sealed together around at least 60% of a periphery thereof to create the cavity.

In certain aspects the MVTR is 1000-4000 grams per square meter per day or more particularly, 2500-3500 grams per square meter per day. In other aspects the hydrostatic head of the top panel is at least 150 cm. In other aspects, the top panel passes ASTM 1670 and ASTM 1671 tests. In other aspects the cover contains a mattress therein. In further aspects the bottom panel is a bleach compatible non-woven polyolefin material. In further aspects the top and bottom panels are made of different materials. In still other aspects, the bottom panel has a weight per square meter which is at least 25% larger than said top panel. In yet other aspects the bottom and top panels are joined via heat sealing around the bottom and top panels such that outer surfaces of said top and bottom panels are sealed together along at least three sides of the cover. In still other aspects, the bottom and top panels are joined via heat sealing around at least four sides of the cover such that the cover surrounds a mattress. In still other aspects, the cover member encloses and is irremovable from a mattress. In yet further aspects the top and bottom panels are sealed together along at least 85% of an entire length of all sides of the cover where the top and bottom panels meet.

In still other aspects a single patient use mattress cover is provided and comprises a bleach compatible cover comprising a non-woven polyolefin material which is configured to secure around a mattress. The non-woven polyolefin material passes ASTM 1670 and 1671 tests and has a moisture vapor transfer rate (MVTR) of at least 400 but less than 5000 grams per square meter per day and a hydrostatic head which is greater than 100 cm.

In particular aspects, the cover is configured with retaining portions on three or more corners thereof, the retaining portions configured to hold the mattress around the sides thereof. In other aspects the cover completely surrounds said mattress. In still other aspects the cover includes an opening for inserting and removing the mattress. In other aspects the opening has a releasable closure. In yet other aspects the cover comprises bottom and top panels sealed together around their edges. In still other aspects, the outer surfaces of the bottom and top panels are sealed together at the edges. In yet other aspects the first support is a fluid retaining bladder with a plurality of cells whose fluid pressures can be modified by a pump.

In yet another aspect a single patient use mattress is provided and includes a cover member defining an interior cavity configured to receive a support structure therein. The support structure is a fluid retaining bladder which is configured to connect to a pump which modifies a fluid pressure in the fluid retaining bladder and the support structure is made from one or more non-porous materials. A top portion of the cover is made of a non-woven bleach compatible polyolefin material having a moisture vapor transfer rate (MVTR) between about 500-5000 grams per square meter per day and a hydrostatic head which is greater than about 100 cm. The support structure is surrounded by the cover member and retained in the interior cavity such that the support structure is irremovable from the cover.

In certain aspects a bottom portion of the cover has a weight in grams per square meter that is at least 25% higher than the top portion. In other aspects the bottom and top portions respectively correspond to bottom and top panels which are sealed together at a seam along edges of the bottom and top panels such that outer surfaces of the bottom and top panels face and are sealed to each other. In other aspects the top portion of the cover passes ASTM 1670 and ASTM 1671.

In other aspects, a method of manufacturing a mattress with a cover is provided including one or more of the steps of: providing a first thermoplastic material; providing a second thermoplastic material, which is a non-woven bleach compatible polyolefin material; sealing the first thermoplastic material at a first seal along at least one edge thereof to create a cavity which retains a fluid pressure therein, the first seal comprising two layers of the first thermoplastic material; sealing the second thermoplastic material to create a second cavity which surrounds the cavity.

In certain aspects sealing said second thermoplastic material includes sealing said second thermoplastic material to the first seal such that the first seal comprises the two layers of said first thermoplastic material and at least one third layer of the second thermoplastic material sealed together. In other aspects the first and second thermoplastic materials are provided in multiple rolls, the two layers of the first thermoplastic material comprising a first layer from a first roll and a second layer from a second roll, the third layer from a third roll. The third roll comprising the second thermoplastic material. In certain aspects the first thermoplastic material is a polyolefin material. In other aspects the sealing of the first and second thermoplastic materials is accomplished by thermal impulse welding. In other aspects the first and second thermoplastic materials are non-reactive to radio frequency sealing without the use of buffers, additives, mechanical catalysts or similar treatments and devices.

In another aspect a mattress is provided and includes a fluid retaining bladder which comprises at least first and second panels of material heat sealed together by thermal impulse welding. A cover includes at least third and fourth panels of material sealed by thermal impulse welding to create a cavity which surrounds the fluid retaining bladder. At least one of the third and fourth panels is a non-woven bleach compatible material. The fluid retaining bladder is configured to connect to a pump 11 to inflate the bladder.

In certain aspects, the first and second panels of material are made from a polyolefin material. In other aspects, the third and fourth panels of material are made from a polyolefin material. In other aspects at least three of the first, second, third and fourth panels are made of a material which is non-reactive to radio frequency sealing without the use of buffers, additives or mechanical catalysts. In other aspects, the first, second, third and fourth panels are sealed together at one seam of the mattress.

Other objects of the invention and its particular features and advantages will become more apparent from consideration of the following drawings, claims and accompanying detailed description.

DETAILED DESCRIPTION OF THE INVENTION

Referring now to the drawings, wherein like reference numerals designate corresponding structure throughout the views. The following examples are presented to further illustrate and explain the present invention and should not be taken as limiting in any regard.

The cover provided herein either when used in a single patient use configuration or in a conventional hospital mattress is both soft and compatible with bleach. Thus hospitals are able to clean the cover with bleach while significantly lowering or eliminating the strikethrough risk described herein.

For high risk patients, the single patient use configuration provides an affordable and disposable mattress, eliminating the risk of cross contamination. During the patient's stay in the hospital, the mattress can be cleaned with bleach or other aggressive cleaning agents. The pressure relieving features provide therapy to reduce the risk of bed sores, or treat existing ones.

Figure 1:
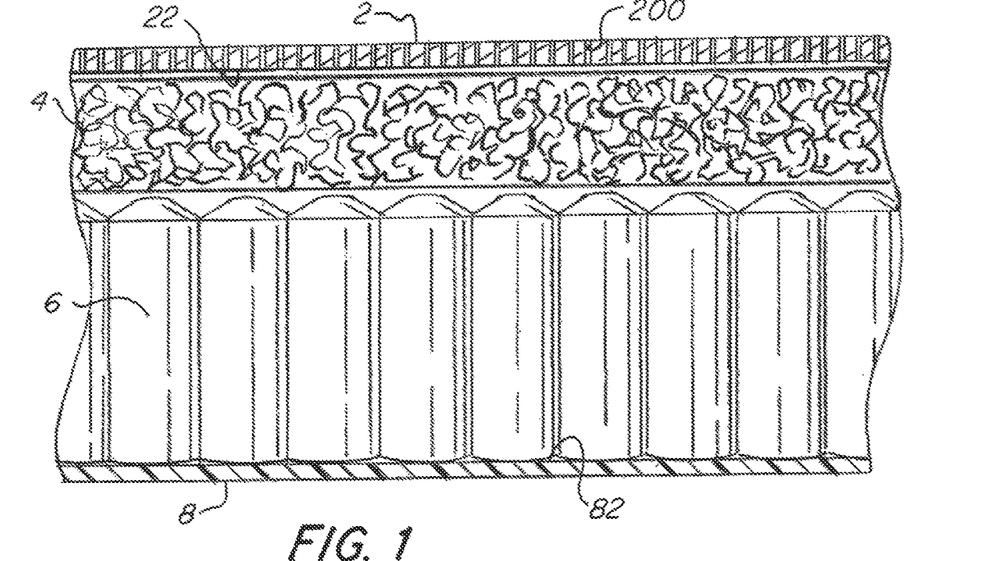
FIG. 1 is a partial section view of a mattress according to the present invention.
Figure 2:
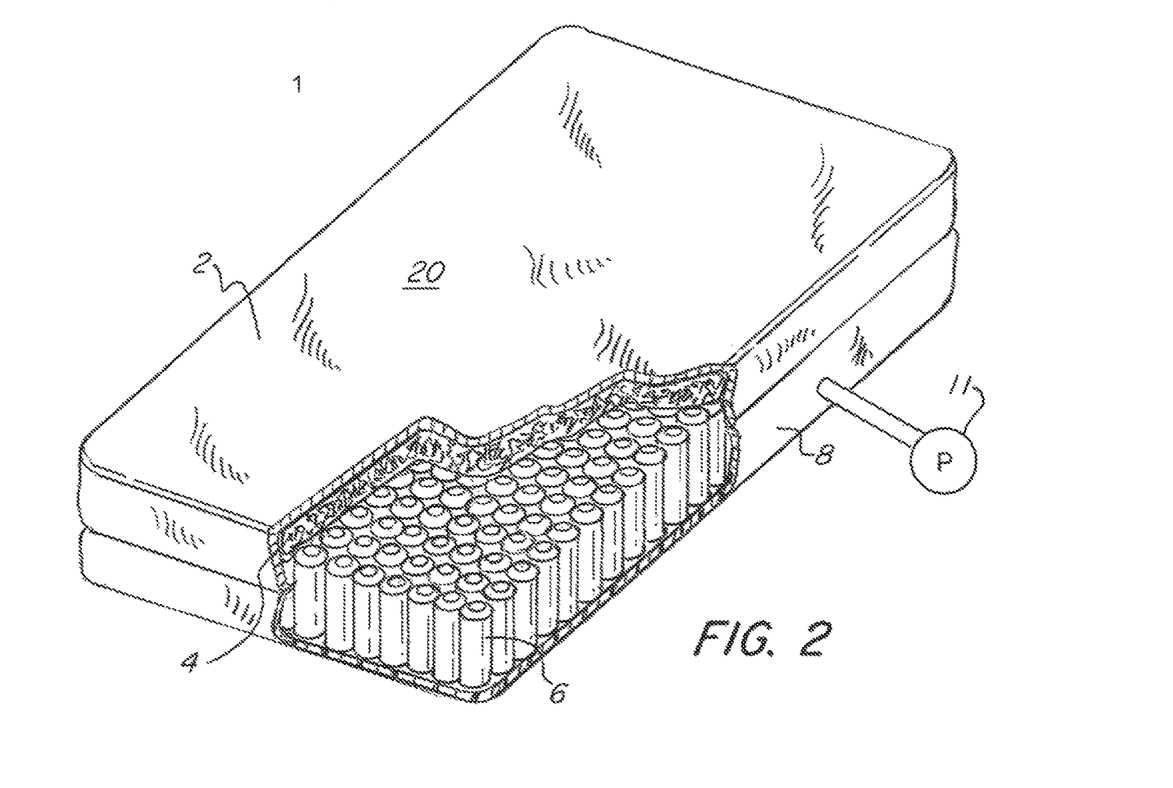
FIG. 2 is a perspective view of the mattress of FIG. 1.

The mattress 1 has a cover comprised of top 2 and bottom 8 panels. The interior 6 of the mattress may be constructed of a number of different materials and configurations. In one embodiment, the support 6 includes an inflatable bladder with a number of cells 6 and a pump 11 inflates the cells and may provide alternating pressure therapy or may be provided to inflate the mattress and then be disconnected. In certain aspects, the support is made of a non-porous material. One example configuration of the interior 6 includes the inflatable mattress systems or structures shown and described or made in accordance with in U.S. Pat. Nos. 6,775,868, 6,817,050, 8,935,820, 9,079,371, 9,481,152, 7,174,589, 7,455,744 and application Ser. Nos. 15/008,073, 15/230,092 and 15/296,776 the content of all of these patents/applications are incorporated by reference herein. It is contemplated that other internal mattress support structures or manufacturing methods known in the art may be used in connection with the cover. It is further understood that the support can be a variety of mattress support structures or pillows or cushions.

The cover is made of a non-woven polyolefin material that is compatible with aggressive cleaners such as bleach or other FDA/EPA registered sporicidal and germicidal materials. More particularly, a polyethylene or polypropylene material may be used and the material may have hydrophobic properties. The material may be constructed as a laminate. In particular embodiments, the material used is compatible with disinfectants such as: a sodium hypochlorite solution of at least 5000 free chlorine particles; UV light, UV-C light, EtO or quaternary ammonia.

The cover is assembled at seam 12 via heat sealing. In some embodiments, the top 2 and bottom 8 panels of the cover may be made of the same material. In other embodiments the top 2 and bottom 8 panels are made from different materials. For example, the bottom 8 may be made of a less expensive material that does not have the same breathable properties as the top 2.

The material of the top 2 panel has a hydrostatic head greater than 100 cm, 150 cm or more particularly greater than 175 cm. In certain embodiments, the hydrostatic head is within the range of 100-300 cm or more particularly, 150-250 cm or even more particularly 175-225 cm as measured between the outer 20 and inner 22 surfaces. In other aspects, the hydrostatic head is greater than 250 cm. Hydrostatic head testing evaluates the behavior of fabrics/materials under increasing hydrostatic pressures. The fabric is sealed to the test apparatus and a water pressure is applied and the water column (pressure) is slowly increased. When sufficient pressure is applied, water will penetrate the fabric and liquid strike-through will occur and thus indicate the hydrostatic head value of the particular material. The mattress cover is also designed to meet the standards of ASTM 1670 and 1671 which relate to AAMI Level 4 claims on surgical gowns. By passing such tests and meeting other parameters described herein, the cover material has a small enough pore 200 size to allow moisture vapor thorough but is not large enough to allow liquids or viruses through and cause contamination. Typically, the pore 200 size is on the order of several microns. This allows the pores to exert relatively strong capillary forces that prevent the penetration of liquids such as water. However, pores can become clogged over time which can lead to the deterioration of the MVTR properties. Therefore, it is preferable if the cover can be disposed of and replaced to avoid contamination of the mattress and to further enable consistent performance and avoid degradation. Alternately, the cover can be provided on a single patient use mattress to increase comfort of the mattress.

The material used for the cover, particularly the outer 20 surface is hydrophobic such that bodily fluids will not penetrate the cover such that they may be easily blotted or wiped away. The hydrostatic head of the material is important in that it avoids or reduces the possibility that fluids will seep into the interior of the mattress. In addition, the moisture vapor transfer rate (MVTR) of the top 2 panel may be at least about 400 grams per square meter per day (24 hours) or in the range of 400-20,000, 400-15,000, 400-5000 or more particularly 1000-4500 or even more particularly 1000-3000 grams per square meter per day (24 hours). More particularly, a fabric with a MVTR range of 2500-4000 or more particularly 3000-3500 grams per square meter per day may be used for the top 2 panel. The MVTR rates described herein allow for appropriate breathability of the cover for comfort and skin protection. Other properties of the top 2 panel may include a weight of 60-100 or more particularly 70-90 or even more particularly 75-85 all in grams/square meter. The bottom 8 panel may be constructed as the same material as the top 2 panel. However, in some embodiments, the bottom 8 panel is a different material. The weight of the bottom 8 panel material may be in the same ranges as those described for the top 2 panel. However, the MVTR may be lower than the top panel for example, less than 2000 or more particularly, less than 1000, less than 500 or even more particularly less than 250 grams per square meter per day. In some aspects, the bottom 8 panel is made from a non-breathable material or laminate in other aspects the bottom is at least 20% or at least 40% or even more particularly at least 50% heavier (grams/square meter) than the top.

The interior of the mattress between interior surfaces 22 and 82 includes the interior space which may include an inflatable bladder 6. In addition, a batting 4, filling or padding material is between the top 2 and the bladder 6 or interior 6 of the mattress. The bladder and/or batting may be individually or collectively considered support and/or padding structures and it is understood that support/padding structures used in connection with the cover are not limited to only the batting/fluid bladder described herein. For example, other support/padding structures known in the art may be used in connection with the cover described herein. The batting 4 material may be made of a polyester material, non-absorbent and non-porous materials may be employed for the batting structure. However, other materials such as foams or porous/absorbent materials and the like may be substituted. In certain embodiments the cover has anti-viral or antibacterial properties. In certain embodiments the cover has fire-retardant properties. The mattress provided may be designed for single patient use with low pressure alternating pressure therapy. The bleach or aggressive cleaner compatible cover enables easy cleaning and disinfecting while providing protection from contamination. The mattress when assembled and covered can be packaged in a container that is less than 15 lbs to enable easy shipping of replacement mattresses and easy installation. In certain embodiments, this 15 lbs package size includes a mattress, tube set and pump. In particular embodiments, the mattress including cover and support structures is less than 10 lbs, more particularly, less than 8 lbs or even more particularly less than 7.0 lbs.

Figure 4:
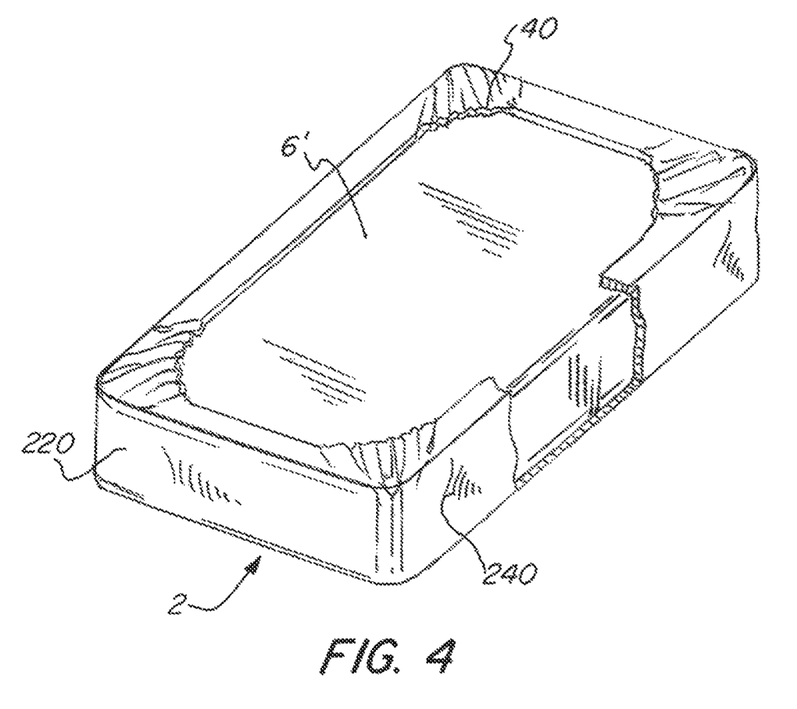
FIG. 4 is a bottom perspective view of a mattress with cover configured as a fitted sheet.
Figures 5, 6:
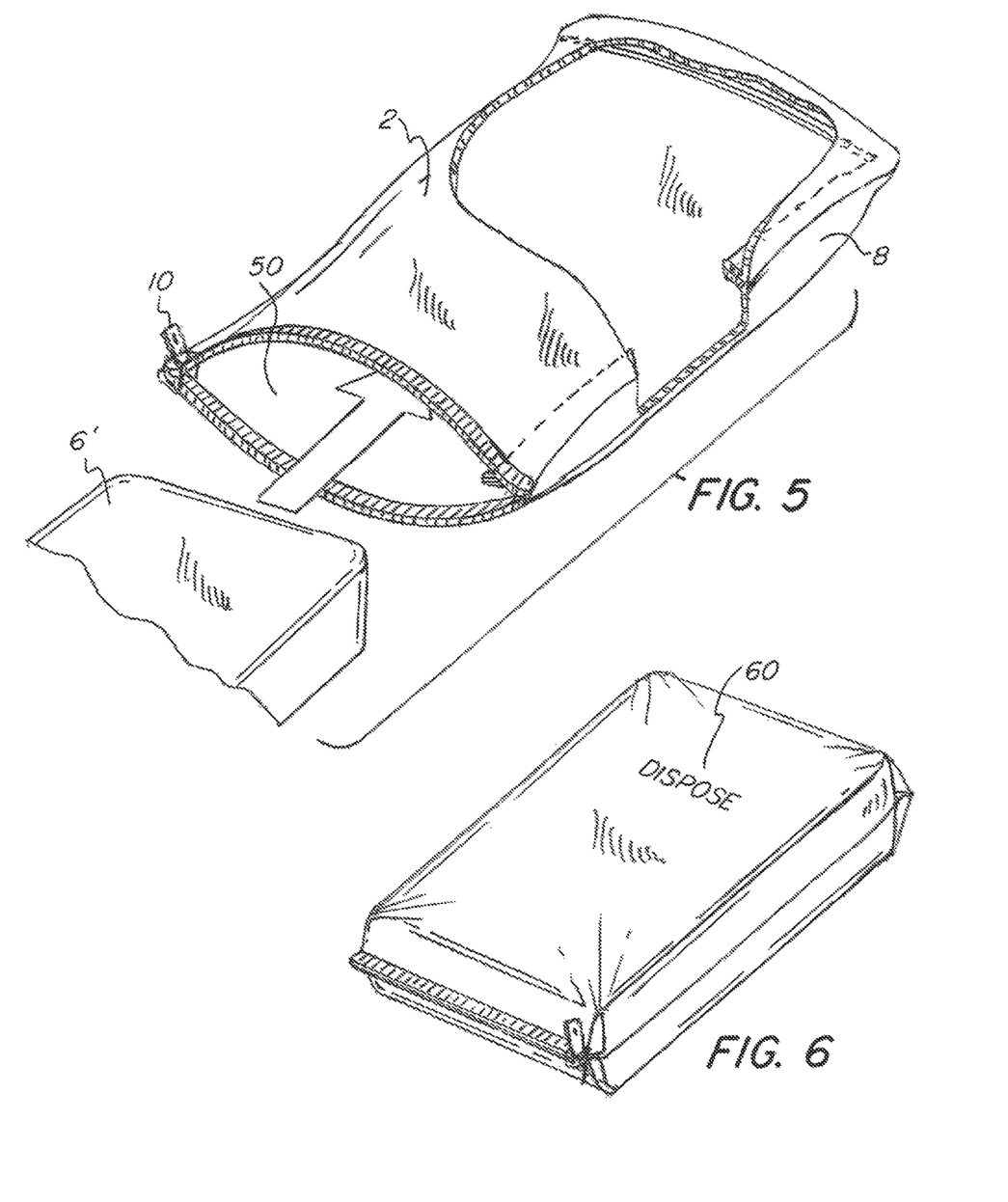
FIG. 5 is a perspective view of a mattress cover with one side opening.
FIG. 6 is a perspective view of the mattress cover of FIG. 5 with a mattress therein.

Furthermore, as shown in FIGS. 4-6, different configurations may be employed for the mattress cover. For example, a fitted sheet style cover which covers the top and sides of the mattress may be employed as shown in FIG. 4. In this embodiment, the top panel 2 may be made of the material designed to pass the ASTM tests described herein and have the particular breathability and hydrostatic head parameters associated therewith. This material may be used on the entirety of the fitted sheet style cover such that the sides 220 and 240 are of the same material. In certain embodiments, the fitted sheet style cover may employ different materials on the side 220, 240 panels. As shown, elastic 40 is located in the corners of the cover to allow the cover to secure around the mattress 6' which may be a conventional mattress, hospital mattress or other support structures such as the fluid bladder 6 or single use mattress.

Furthermore, a pillowcase style cover can also be used as shown in FIGS. 5-6. This embodiment again may use the top panel 2 which meets the ASTM tests described herein and has the particular MVTR and/or hydrostatic head characteristics described. The bottom panel 8 can be of the same or different material as described herein. In this embodiment, an opening 50 is provided on one end and a releasable closure 10 can close off this opening. In this manner the support 6' can be inserted into the cover much like a pillowcase and then closed therein to secure the cover to the mattress as shown in FIG. 6. Although a zipper is shown in FIG. 5, other releasable closures can be used such as hook/loop (e.g. Velcro® or similar) or other releasable closures. In certain embodiments, the cover size may be reduced to pillowcase size to further provide the advantageous properties of the cover to pillows.

The cover may be removable from the mattress so as to allow cleaning services to clean the cover. More optimally however, the cover may be designed as a single patient use cover which is not appropriate for cleaning, but rather can be discarded or recycled. In addition, the cover may have a moisture or heat activated ink 60 which bleeds or becomes visible or changes in color or undergoes other visual changes after a particular amount of moisture exposure or penetration to indicate that the cover has reached its useful life, or can no longer be used safely. Particularly, the ink 60 may become visible at a predetermined condition of use prior to the cover or top panel/portion failing ASTM 1670 and/or ASTM 1671 or when the MVTR or hydrostatic head is expected to be outside of predetermined design requirements. In other aspects, the cover may be permanently or irremovably secured around the mattress, typically in a single patient use mattress.

The covers and materials herein are in certain embodiments are designed for single patient use in that they are not suitable for passing through laundry. Particularly, a hospital laundry may clean fabrics at 160 f (71 c) for 25 minutes, typically using bleach or other aggressive chemicals/detergents. The materials herein generally have melt temperatures below 320 f (160 c), typically from 221 f (105 c) to 320 f (160 c). Exemplary material melt temperatures are: LDPE 105 c; LLDPE 122 c; Polypropylene 165 c; Spun Bond Polypropylene 150 c; PLA 150-160 c. Non-woven materials are typically made by using multiple filaments of material which are bonded with heat, binders or entangled in another manner using mechanical methods. In this manner, the appropriate pore size is created such that the materials are hydrophobic but still allow vapor to pass. However, once the material is exposed to an elevated temperature, for example over 120 f (48 c), the properties of the material may be distorted such that they no longer act as designed in the hydrophobic but breathable manner. Laundering may also cause the materials to de-laminate, shrink, suffer degradation from abrasion or suffer other damage to their physical or functional properties.

Furthermore studies show that hospital laundering facilities and equipment can be contaminated by *C. difficile* and other infectious organisms, and thus become a source for HAIs.

Particularly, the materials used herein once exposed to a water temperature of above 140 f or above 150 f or at about 160 f for more than 20 minutes, the MVTR may increase at least 10%, at least 20% or even more particularly at least 25% and the Hydrostatic head may decrease at least 10%, at least 20% or even more particularly at least 25%.

Figure 3:
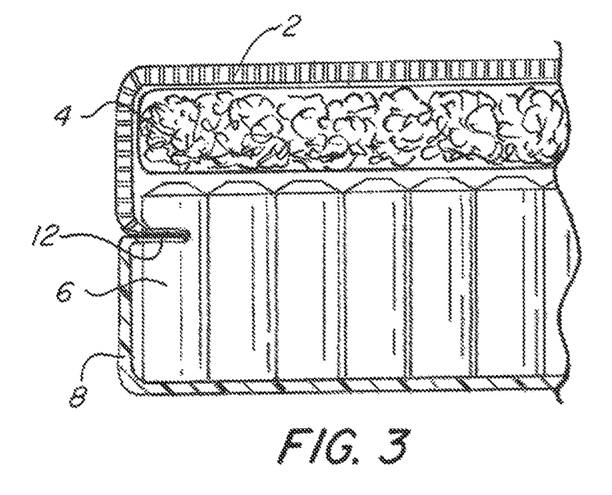
FIG. 3 is a detail view of FIG. 2.
Figure 7:
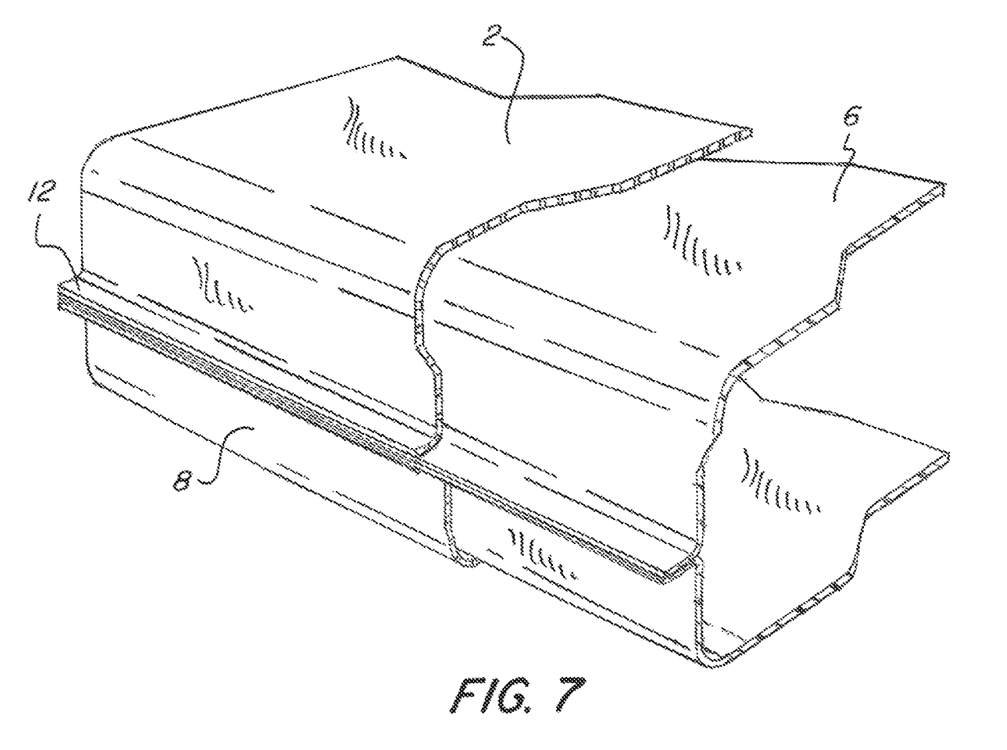
FIG. 7 is a perspective view of one type of mattress/cover assembly/construction.
Figure 8:
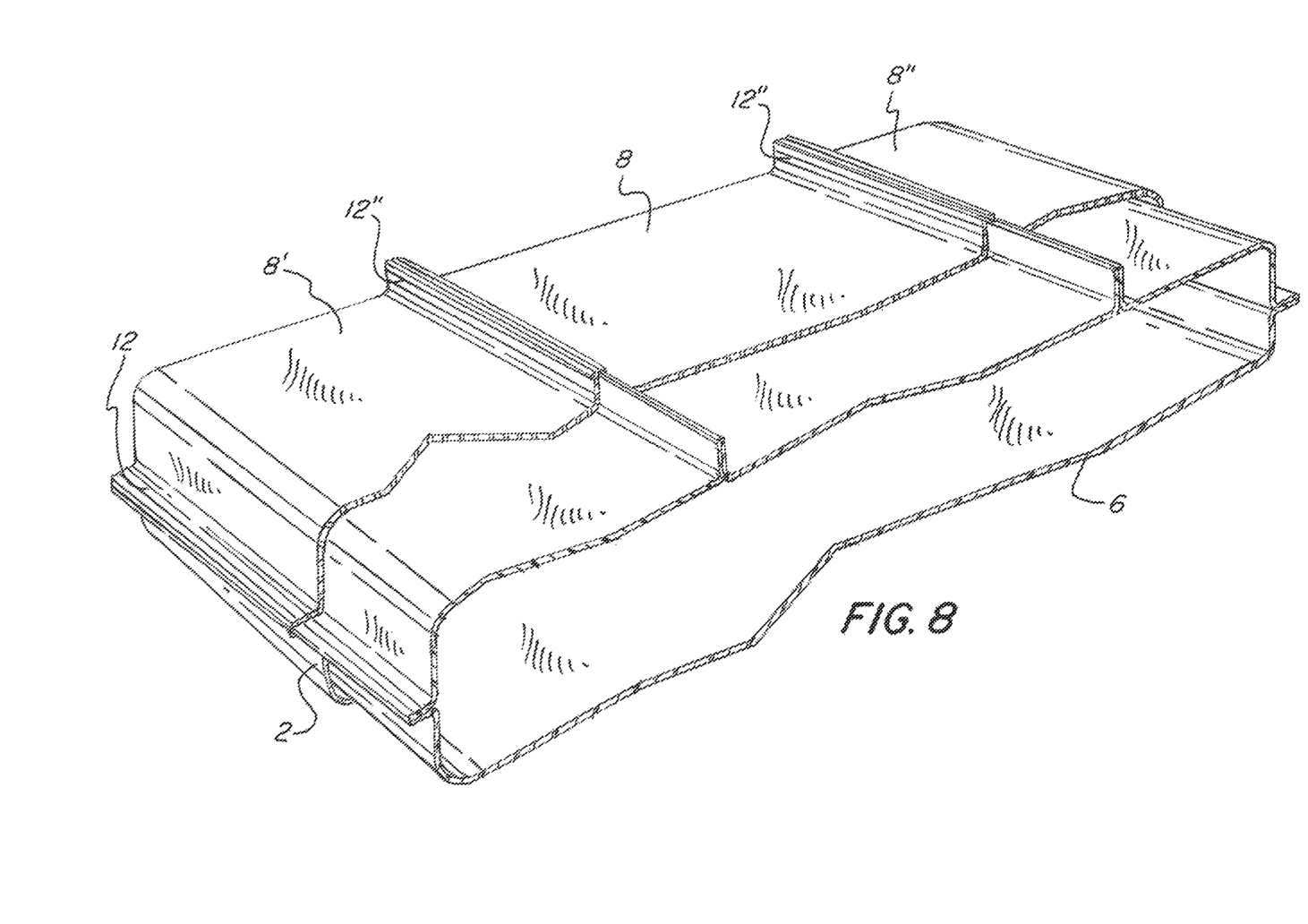
FIG. 8 is a perspective view of an additional type of mattress cover assembly/construction.

As shown in FIGS. 7-8, the cover may be produced in connection with the support structure. In those figures, the bladder 6 is shown with an outer seal 12 and the pieces of the cover sealed directly to seal 12. Alternately, the seal may be an inner seal in certain embodiments as shown in FIG. 3, with multiple layers sealed together or with the cover surrounding but not sealed (partially or completely) to the bladder. FIG. 8 shows an embodiment where a panel of the cover has intermediate seals 12', 12" which create a multiple piece (8/8'/8") panel. This multiple piece panel can be used on both the top and bottom panels or just one thereof (the example shown is with a bottom panel being made of multiple pieces 8/8'/8").

Furthermore, in the preferred embodiments the materials used herein are sealed by thermal impulse welding rather than radio frequency energy sealing. Particularly, the materials used are not susceptible or visible to radio frequency sealing without the use of additives, buffers or mechanical catalysts.

It is understood that other methods of joining the materials may be used as would be apparent to those skilled in the art. These methods include ultrasonic welding, RF welding and the use of adhesives.

Figure 9:
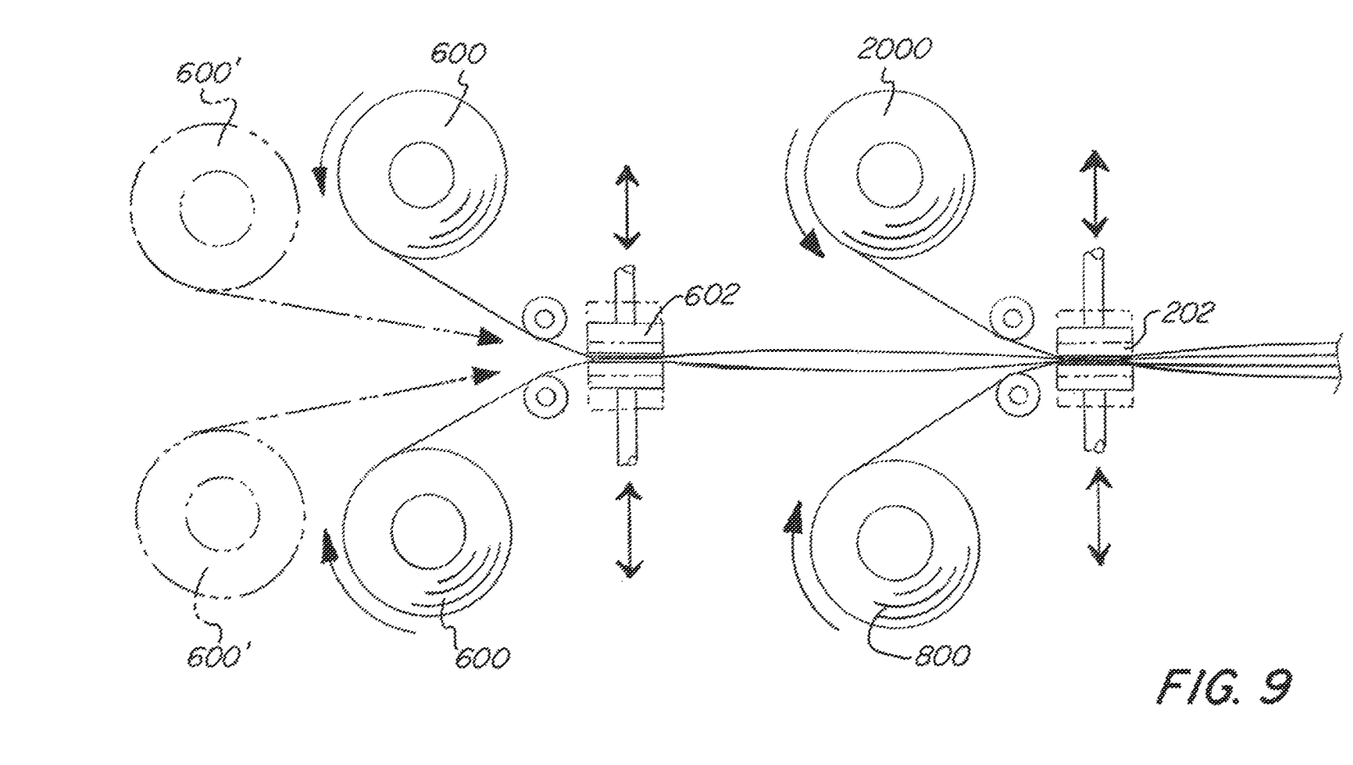
FIG. 9 is an exemplary view of machinery for manufacture of the mattress and/or cover according to the present invention.

FIG. 9 shows an exemplary machine for manufacturing the cover. In the particular embodiment shown, the cover is manufactured in a manner that it surrounds the inner bladder. As shown, bladder rolls 600 are provided and sealed at thermal impulse welder 602 to create the inner bladder structure or support for the mattress. It is contemplated that more than two rolls (600/600') may be provided to manufacture the bladder and/or cover. Cover rolls 2000/800 are provided to lay the non-woven material over the bladder and seal the edges at seal 12 with thermal impulse welder 202 so that the seal is effectively a four layer structure sealed together, with the inner two layers being part of the bladder and the two outer layers making the cover. The top cover roll 2000 and the bottom cover roll 800 may be different or the same material. In particular embodiments, the cover roll 2000 may be the same material as the top panel 2 and the bottom cover roll 800 may be the same material as the bottom panel 8. In certain embodiments, the bladder may not be provided and rather the machine may simply make the cover by heat sealing and provide for the opening described herein to receive a support structure. In other embodiments, the cover may be made to surround the support structure (e.g. the bladder) but not be physically sealed/welded to the bladder. Additional rolls may be provided to make the multi-piece cover and/or a multi-piece bladder structure by heat sealing. As shown in FIG. 1, the bladder may have a plurality of baffle structures which are all joined together by heat sealing of various films, particularly polyolefin films. This departs from traditional pressure relieving mattresses which rely on multiple discrete tubes or structures which are in effect connected by plumbing fittings to create a multi baffle support structure. In contrast, the present mattress with cover provides a sealed bladder with cover there around without plumbing or fittings between each of the discreet baffles within the bladder.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A cover comprising:
    a cover member defining a cavity configured to receive a support structure therein, the support structure comprising a cushion;
    top and bottom panels of said cover member, wherein said top panel is made of a non-woven bleach compatible polyolefin material having a moisture vapor transfer rate (MVTR) of at least 400 grams per square meter per day and a hydrostatic head which is greater than 100 cm such that the MVTR and hydrostatic head of the material creates a cover which is breathable but impervious enough to inhibit liquids, bacteria and viruses from passing through the top panel of the cover;
    said top and bottom panels sealed around at least 60% of a periphery thereof to create said cavity;
    wherein the non-woven bleach compatible polyolefin material is a laminate material; the laminate comprised of polyolefin filaments and maintains the hydrostatic head and MVTR properties after exposure to cleaning with bleach in conformance with hospital cleaning procedures for Class II medical devices.

2. The cover of claim 1 wherein the MVTR is 1000-7500 grams per square meter per day.

3. The cover of claim 1 wherein the MVTR is 2500-3500 grams per square meter per day.

4. The cover of claim 1 wherein the hydrostatic head of the top panel is at least 150 cm.

5. The cover of claim 1 wherein the top panel passes ASTM 1670 and ASTM 1671 tests.

6. The cover of claim 1 wherein the cushion is a mattress and the cover contains the mattress therein.

7. The cover of claim 1 wherein the bottom panel is a bleach compatible non-woven polyolefin material.

8. The cover of claim 1 wherein said top and bottom panels are made of different materials.

9. The cover of claim 1 wherein said bottom panel has a weight per square meter which is at least 25% larger than said top panel.

10. The cover of claim 1 wherein said bottom and top panels are joined via heat sealing around the bottom and top panels such that outer surfaces of said top and bottom panels are sealed together along at least three sides of the cover.

11. The cover of claim 1 wherein said bottom and top panels are joined via heat sealing faces of the bottom and top panels together.

12. The cover of claim 1 wherein said cover member encloses and is irremovable from the cushion and the cushion is a mattress.

13. The cover of claim 11 wherein said top and bottom panels are sealed together along at least 85% of an entire length of all sides of the cover where the top and bottom panels meet.

14. A cover comprising:
    a bleach compatible cover comprising a non-woven polyolefin material which is configured to secure around a support structure which comprises a cushion;
    the bleach compatible cover passes ASTM 1670 and 1671 tests and has a moisture vapor transfer rate (MVTR) of at least 400 grams per square meter per day and a hydrostatic head which is greater than 100 cm;
    wherein the non-woven polyolefin material is a laminate material;
    the laminate comprised of polyolefin filaments and maintains the hydrostatic head and MVTR properties after cleaning with bleach at a level adequate to kill *C. difficile*.

15. The cover of claim 14 wherein said cover is configured with retaining portions on three or more corners thereof, the retaining portions configured to hold the support structure around the sides thereof.

16. The cover of claim 14 wherein said cover completely surrounds the cushion mattress and said cushion is a mattress.

17. The cover of claim 14 wherein said cover includes an opening for inserting and removing the mattress.

18. The cover of claim 17 wherein said opening has a releasable closure.

19. The cover of claim 14 wherein said cover comprises bottom and top panels sealed together around their edges.

20. The cover of claim 19 wherein the outer surfaces of the bottom and top panels are sealed together at the edges.

21. The cover of claim 14 wherein the mattress is a fluid retaining bladder with a plurality of cells whose fluid pressures can be modified by a pump.

22. A cover comprising:
    a cover member defining a cavity configured to receive a support structure therein, the support structure comprising a cushion;
    top and bottom panels of said cover member, wherein said top panel is made of a non-woven bleach compatible polyolefin material having a moisture vapor transfer rate (MVTR) of at least 400 grams per square meter per day and a hydrostatic head which is greater than 100 cm such that the MVTR and hydrostatic head of the material creates a cover which is breathable but impervious enough to inhibit liquids, bacteria and viruses from passing through the top panel of the cover;
    said top and bottom panels sealed around at least 60% of a periphery thereof to create said cavity;
    wherein the non-woven bleach compatible polyolefin material is a laminate material; the laminate comprised of polyolefin filaments and maintains the hydrostatic head and MVTR properties after cleaning with bleach at a level adequate to kill *C. difficile*.

23. The cover of claim 22 wherein the cushion is a mattress.

24. A cover comprising:
    a bleach compatible cover comprising a non-woven polyolefin material which is configured to secure around a support structure which comprises a cushion;
    the bleach compatible cover passes ASTM 1670 and 1671 tests and has a moisture vapor transfer rate (MVTR) of at least 400 but less than 7500 grams per square meter per day and a hydrostatic head which is greater than 100 cm;
    wherein the non-woven polyolefin material is a laminate material; the laminate comprised of polyolefin filaments and maintains the hydrostatic head and MVTR properties after exposure to cleaning with bleach in conformance with hospital cleaning procedures for Class II medical devices.

25. The cover of claim 24 wherein the cushion is a mattress.

26. A cover comprising:
a bleach compatible cover comprising a non-woven polyolefin material which is configured to secure around a support structure which comprises a cushion;
the bleach compatible cover passes ASTM 1670 and 1671 tests and has a moisture vapor transfer rate (MVTR) of at least 400 but less than 7500 grams per square meter per day and a hydrostatic head which is greater than 100 cm;
wherein the non-woven polyolefin material is a laminate material; the laminate comprised of polyolefin filaments and maintains the hydrostatic head and MVTR properties after exposure to cleaning with bleach in conformance with protocols for cleaning reusable medical devices.

* * * * *